Figure 1:
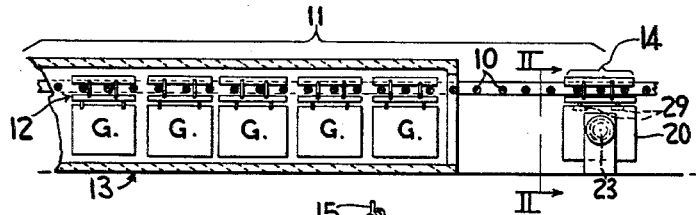

Dec. 22, 1964 J. H. CYPHER 3,162,521
METHOD OF SHAPING A VERTICALLY SUPPORTED GLASS SHEET
Filed Aug. 8, 1961

INVENTOR.
JAMES H. CYPHER
BY
Oscar H. Spencer
ATTORNEY

3,162,521
METHOD OF SHAPING A VERTICALLY SUPPORTED GLASS SHEET

James H. Cypher, New Kensington, Pa., assignor to Pittsburgh Plate Glass Company, Pittsburgh, Pa., a corporation of Pennsylvania
Filed Aug. 8, 1961, Ser. No. 130,028
6 Claims. (Cl. 65—106)

The present invention relates to treating glass and particularly refers to improvements in shaping glass sheets wherein a heat-softened glass sheet is supported in spaced relation between two complementary forming members and is shaped by being sandwiched between said forming members while in a plastic condition.

Flat glass sheets are shaped successively by heat-softening followed by sandwiching the major surfaces of each heat-softened glass sheet between a pair of glass forming members having complementary convex and concave shaping surfaces opposing one another. During such an operation, the glass sheets are gripped near their upper edges by tongs. The latter are suspended from carriages which are conveyed along a horizontal path of a conveyor that extends through a furnace and a glass forming station.

During the heating that softens the glass before it is shaped, the tongs provide a pair of gripping forces opposing one another through the thickness of the glass sheet. Each glass sheet is suspended in a vertical plane from the tongs. Normally more than one set of tongs is needed to support a flat glass sheet.

One reason for requiring more than one set of tongs is that the movement of the heat-softened glass sheet into and out of the glass forming station is intermittent. The glass is accelerated from the heating furnace to the forming station. It is stopped altogether while the forming members move toward one another against the opposite surfaces of the heat-softened sheet. Then the glass is moved rapidly from the forming station into a quenching station where streams of cool air are dispensed under pressure against the opposite major surfaces of the now shaped glass sheet. Thus a tendency exists for the glass sheet to pivot about an axis extending through its thickness every time the glass sheet is suddenly accelerated or decelerated along its path of movement. Suspending the glass from at least two sets of tongs reduces this tendency for the glass sheet to pivot.

It also has been found necessary to hang glass sheets of a size now required to be fabricated to satisfy customer demands from at least two sets of tongs because a single set of tongs applies a gripping force of sufficient magnitude to cause severe penetration into the softened glass surfaces while suspending the weight of the entire glass sheet therefrom.

Many devices have been developed to insure that flat glass sheets are properly suspended initially from a plurality of sets of tongs. Proper loading reduces the likelihood that each set of tongs will apply a twisting force that distorts the glass and imposes a defect known as a kink therein. When glass is loaded properly, the gripping force applied thereto by each set of tongs is substantially equal to that applied by each other set of tongs.

Each pair of tongs exerts a pull in a substantially vertical direction at each glass gripping region gripped by a pair of tongs. When the glass sheet is heat-softened, its low viscosity at elevated temperatures permits the glass to distort in the vicinity of each gripping region and form a convex bump in the upper edge of the supported glass sheet. The effect of this pulling is minimized when the portion of the glass weight borne by each set of tongs is minimized.

An optimum condition is obtained when the number of tongs used is increased and an equal portion of the glass weight is borne by each pair of tongs. However, the complexity of loading a glass sheet increases with the number of pairs of tongs used. Therefore, a compromise is usually made to limit the number of pairs of tongs used to the minimum needed to support the glass sheet and obtain an upper edge distortion within acceptable tolerance.

When the prior art techniques for gripping a flat glass sheet by a plurality of tongs are employed for tempering flat glass sheets, the defects due to kinking and pulling are reduced substantially. However, when the flat glass sheets are shaped into curved configurations, the prior art criteria for suspending flat glass sheets properly are insufficient to avoid this defect.

When glass sheets are formed into a curved shape about a horizontally disposed axis of curvature according to the methods of the prior art, the glass is simultaneously contacted at one surface by a convex forming member and at its other surface by the upper and lower extremities of a concave forming member. The outermost portion of the convex forming member contacts one surface of the glass sheet intermediate upper and lower lines of contact of the concave shaping surface of the concave forming member on the other surface of the glass sheet.

As the forming members continue to move simultaneously toward one another after having made initial contact with the opposite surfaces of the glass sheet, the upper and lower edges of the glass sheet are displaced to one side of the original vertical plane of support for the flat glass sheet while the central portion of the glass sheet is displaced to the opposite side of said vertical plane. This simultaneous movement causes the forming members to apply a gripping force on the glass sheet that exceeds that of the tongs. Hence, the glass is pulled, distorted, marred, and sometimes even removed completely out of gripping relation with the tongs during the time the convex and concave forming members sandwich the curved glass sheet therebetween. This prior art technique has been found to be a substantial cause for losses during production runs.

The present invention suggests avoiding the defects of the prior art production methods by employing a novel technique for moving the forming members in a prearranged sequence of motions so that one of the glass forming members comes into contact with one surface of the glass sheet while the other forming member is out of contact with the glass sheet. Subsequently the other forming member only is moved toward a mating position with the first forming member until the glass sheet is sandwiched in pressurized relation between the forming members, while the first forming member is maintained in contact with the first surface of the glass sheet.

The first forming member to contact the glass sheet helps the tongs support the glass sheet while the latter is being sandwiched between the two forming members as the second forming member moves into pressurized engagement with the other surface of the glass sheet according to the programming suggested by the present invention. This partial support by one of the glass forming members which results from using the programming technique of the present invention replaces the gripping force applied by the simultaneously moving glass forming members using the prior art techniques. Hence, the technique suggested by the present invention helps the tongs support the glass sheet rather than opposing the gripping force of the tongs as in the prior art.

According to a specific embodiment of the present invention, the concave forming member is moved into contact with one surface of the glass sheet and then stopped to provide supporting contact for the glass sheet while the convex forming member is out of contact with the glass sheet. When the convex forming member is moved toward a mating position with the concave forming member, the latter is maintained in contact with the glass sheet to help the tongs support the latter until the forming members are in alignmen with one another and in pressurized contact with the opposite surfaces of the glass sheet.

It is believed that the improvement in operation occurring as a result of substituting sequential movements of the two complementary glass forming members in the manner described herein minimizes the gripping force of the glass forming members that applies a pull which tends to distort the glass sheets in the vicinity of the regions gripped by the tongs. If the concave forming member is moved beyond the vertical plane of original contact with the vertically suspended glass sheet, the vertically suspended tongs are displaced in an arc in a vertical plane normal to the vertical plane defined by the contacted surface of the suspended flat glass sheet. If the glass sheet is simultaneously gripped by the opposing glass forming members at its opposite surfaces as taught by the prior art, the glass is not free to move upwardly in response to the arcuate movement of the tongs. Therefore, the vertical position of the tong gripping members tends to move upwardly while the movement of the opposing glass forming members in a fixed horizontal plane tends to shorten the vertical dimension of the glass and to lower its upper edge. The heat-softened glass sheet tends to flow in the vicinity of the regions gripped by the tongs if the glass is sufficiently hot. If the glass is not sufficiently hot to flow in the manner just described, venting and marking and chipping are likely to occur in the vicinity of the tongs gripped regions.

When the glass is first contacted on one surface only by one of the glass forming members and then contacted on the other surface by the other glass forming member while the first glass forming member to contact the glass sheet provides a rigid abutment for the glass sheet, swinging of the tongs in a vertical plane passing through the thickness of the glass sheet is avoided, and the pulling effect of the clamping force of the complementary forming members opposing that of the tongs is minimized.

Other factors which may be incorporated in the present method of operation to further minimize production losses include the employment of freely rotatable discs as the glass gripping elements of the tongs instead of tong points as described and claimed in application Serial No. 46,306 of William J. Hay, filed July 29, 1960, for "Supporting Glass Sheets," providing oblique upward movement for the glass forming members instead of opposing horizontal movement as described and claimed in application Serial No. 113,853 of Deal L. Thomas, filed May 31, 1961, for "Shaping Glass," and tilting the shaping surfaces of each glass forming member relative to its axis of movement so that the portion of each complementary shaping surface that is tangent to a vertical plane lies toward the upper edge of the shaping surface, either as depicted in the latter patent application or somewhere intermediate the upper edge and the center of the forming member, particularly when the bending curve is not uniform about a horizontal axis of curvature.

Accordingly it is an object of the present invention to minimize losses in producing bent glass sheets by press bending, particularly upper edge distortion and vents due to pulling forces between the glass gripping tongs and the glass forming members along a direction parallel to the major glass sheet surfaces and to minimize kinks in press shaped glass sheets due to twisting forces applied by the glass gripping tongs on localized regions of the glass sheets.

The above and other objects will be understood better after the reader has studied a description of a typical illustrative embodiment of the invention which follows.

Figure 2:
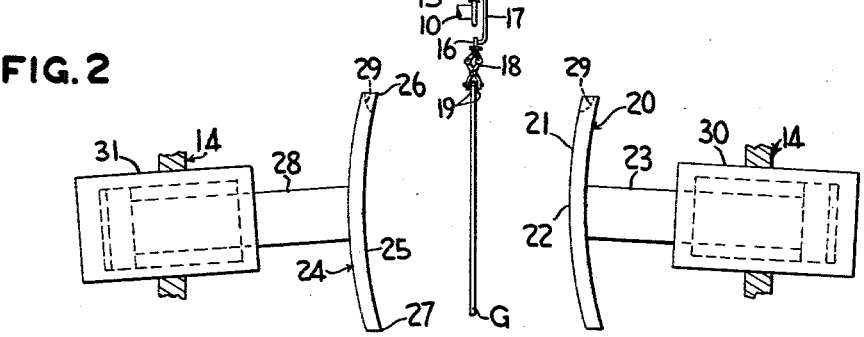
Figure 3:
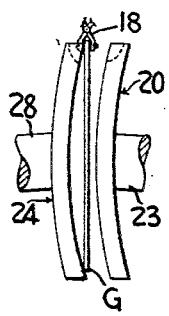
Figure 4:
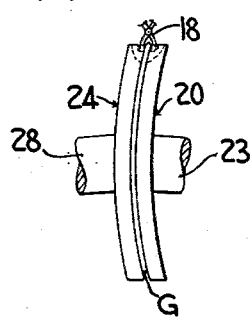

In the drawings which form part of the description of the illustrative embodiment and wherein like reference numerals are applied to like structural elements, FIG. 1 is a fragmentary longitudinal view of a typical furnace and glass forming station in which the present invention may be employed successfully;

FIG. 2 is a fragmentary transverse view of a glass forming station taken along the lines II—II of FIG. 1, showing two substantially complementary glass forming members in retracted position preparatory to move toward one another in the manner taught by the present invention and showing a glass sheet supported in spaced relation between the two complementary glass forming members;

FIG. 3 is a fragmentary view similar to that shown in FIG. 2 showing the relative position of the glass forming members to the glass at the moment one of the forming members has moved into contact with one surface of the glass sheet while the other forming member is out of contact with the glass sheet; and FIG. 4 is a fragmentary view similar to that shown in FIGS. 2 and 3 showing the position of the glass forming members in contact with the opposite surfaces of the glass sheet at the end of the glass forming operation.

Referring to the drawings, reference number 10 refers to the driving rolls of a carriage conveyor 11 for moving carriages 12 along a horizontal path through the upper portion of a tunnel-like furnace 13 and a glass forming station 14. Each carriage 12 is composed of a cast iron alloy and comprises an upper beam 15 that rides on rolls 10 and a lower beam 16 interconnected to the upper beam 15 by a pair of arcuately shaped vertically extending connecting rods 17 (FIG. 2). The lower beam 16 of each carriage 12 has suspended therefrom a pair of steel alloy glass gripping tongs 18 which grip a supported glass sheet G at two spaced regions along its upper edge.

Each pair of tongs 18 has a pair of glass gripping elements 19 that apply opposing forces through the glass thickness to hange the glass sheet therefrom in a vertical plane. Preferably the glass gripping elements 19 are freely rotatable discs or disc-like members having a portion of their edge surface contacting the opposite surfaces of the glass sheet adjacent its top edge. The discs or disc-like members which serve as glass gripping elements 19 are freely rotatable about axes extending vertically.

Referring to FIG. 2, the glass forming station 14 comprises a convex glass forming member 20 having a convex shaping surface 21, whose outermost portion is indicated by reference numeral 22. An actuating piston 23 is mounted to the rear of convex glass forming member 20 to urge the latter to move along the axis defined by the length of the piston toward and away from the vertical plane occupied by the glass sheets G in succession at the loading station 14.

At the other side of the vertical plane occupied by the glass sheets, the glass forming station 14 comprises a concave glass forming member 24 having a concave shaping surface 25 which conforms to and is substantially complementary to the convex shaping surface 21 of convex glass forming member 20. The difference in shape between shaping surfaces 21 and 25 permits the insertion of a glass sheet of finite thickness therebetween.

Reference number 26 refers to the upper edge of the concave shaping surface 25, whereas reference number 27 refers to the lower edge of the concave shaping surface 25. An actuating piston 28 is mounted to the rear of concave glass forming member 24 to urge the latter to move along the axis defined by the length of the piston 28.

Glass forming members 20 and 24 are composed of a heat resistant material such as stainless steel provided with a covering of fiber glass or asbestos or the like at their shaping surfaces. When they are in mating engagement with one another and sandwiching a glass sheet G therebetween, clearance must be provided for the tongs 18. These clearances or notched out portions are depicted by reference characters 29.

Pistons 23 and 28 are movably mounted in piston cylinders 30 and 31, respectively, to urge the glass forming members 20 and 24 toward and away from mating engagement with one another. Piston cylinders 30 and 31 are rigidly attached to the structural support for the glass forming station 14.

In the past, actuating pistons 23 and 28 have been mounted for equal, simultaneous movement toward and away from one another. The improvement provided by the present invention involves controlling the movement of the actuating pistons 23 and 28 so that the convex glass forming member 20 and the concave glass forming member 24 to which actuating pistons 23 and 28 are operatively connected, respectively, move in a controlled sequence of operations.

According to the specific illustrative embodiment of the present invention described herein, the movement of the forming members 20 and 24 is programmed so that the upper edge portion 26 and lower edge portion 27 of concave shaping surface 25 of the concave glass forming member 24 contacts the major surface of the glass sheet G facing to the left of FIGS. 2, 3, and 4 at the limit of its innermost movement to support the sheet against horizontal displacement while convex glass forming member 20 is spaced from the glass sheet. The latter continues to move toward a mating position with concave glass forming member 24 until the glass forming members 20 and 24 are in alignment with one another and in pressurized contact with the opposite surfaces of the glass sheet, as depicted in FIG. 4. During the latter stage of inward movement of the convex member 24, it causes some upward sliding of the glass sheet bottom portion along the concave shaping surface 25, thus compensating for some of the shortening of the vertical dimension of the glass sheet as it bends about a horizontal axis.

The actuating pistons then retract both glass forming members to permit the shaped glass sheet to move rapidly from the glass forming station 14 to a glass quenching station (not shown) and prepare the glass forming station to receive the next glass sheet to be formed by press bending.

Many devices may be used to control the sequence of operation of the glass forming members described hereinabove. For example, timing circuits may be interconnected to one another and to the actuating pistons 23 and 28 in such a manner as to provide the necessary sequence of operation. However, a simple apparatus comprises a relatively short piston cylinder 31 for actuating piston 28 which controls the position of the concave glass forming member 24 and a relatively long piston cylinder 30 for actuating piston 23 which controls the location of the convex glass forming member 20. By having both pistons of equal cross-sectional areas, and by locating the piston cylinders in such locations that the innermost position of movement permitted by piston cylinder 31 for actuating piston 28 is in the position shown in FIG. 3 and the innermost position of movement piston cylinder 30 permits for actuating piston 23 is in the position depicted in FIG. 4 and by having a common hydraulic supply for actuating the pistons, pistons 23 and 28 are moved inwardly at equal rates. However, because of the relative location and size of piston cylinders 30 and 31, the convex glass forming member 20 is permitted to move inwardly after the concave glass forming member has come to rest.

Another technique employed successfully is to employ adjustable hydraulic check means for controlling the relative rates of movement for the pistons within piston cylinders of equal length for the pistons to enable piston 28 to move concave glass forming member 24 relatively rapidly toward its innermost position, while piston 23 moves convex glass forming member 20 more slowly toward its innermost position. Typical adjustable hydraulic check means is shown in Belgian Patent No. 585,-647. Other modifications and combinations of the above and their equivalent structures will become obvious in the light of the various suggestions made above. Also, high temperature springs may be used to retract the pistons between glass forming operations.

*Example*

The following details are supplied of a typical operaiton to produce curved side lights of tempered glass 16 inches high, 28 inches long, and of nominal thickness of ¼ inch bent to a uniform radius of curvature of 60 inches. Glass sheets precut to the desired outline were heated gradually for a period of about 4 minutes to a surface temperature of about 1225° F. During this heating phase the sheets were conveyed through a tunnel-like furnace at a constant speed. When the previous glass sheet had been shaped and the glass forming members were being separated, the furnace exit door opened and the next sheet moved to the glass forming station. About 4 seconds elapsed in moving the sheet from the furnace exit to its proper position at the glass forming station.

The glass forming members were moved toward one another with the concave forming member contacting one surface of each supported glass sheet while the convex forming member was spaced about ¾ inch therefrom. It took about 2 seconds for the glass forming member to close and impress their shapes onto the opposite major surfaces of the heat-softened glass sheets.

The glass forming members were held in pressurized contact with the opposite surfaces of the glass sheet at a pressure of about 1 pound per square inch for about 2 seconds and then were retracted to receive the subsequent heat-softened glass sheet therebetween for forming. The subsequent heat-softened glass sheet was being subjected to the heat treatment in the heating furnace while the glass sheet in question was being press bent.

Losses of glass sheets during the glass forming operation described above were less than one percent of those pressed. By contrast, over thirty percent loss was experienced in press bending glass sheets of the same pattern using simultaneous movement of the glass forming members toward each other to sandwich the glass sheets.

In order to insure that the glass forming members move toward one another rapidly and then are hydraulically checked toward the end of their inward movement so as to avoid chattering and other vibrations in the glass, hydraulic check means such as disclosed in Belgian Patent No. 585,647 may be incorporated.

It is understood that the principles described above must be followed in modified form as the depth and complexity of bend varies, but that they are needed to produce either simple bends in which the glass is bent about a horizontal axis of bending or a compound bend wherein the glass is bent about more than one axis of bending including one having a horizontal component.

A description of an illustrative embodiment of the present invention has been made for the purpose of illustration rather than limitation, and many equivalent modes of operation will become obvious in the light of the present disclosure. For example, the glass sheet may be supported by supporting elements other than tongs during the press bending operation, such as wires or refractory blocks that support the glass sheet along its bottom edge. The sequential engagement of the vertically supported glass sheet, first by one forming member which is stopped when it contacts one surface of the glass sheet while the other forming member is out of contact with the opposite surface of the glass sheet benefits the shaping operation in a manner not suggested previously. The first forming member contacting the glass sheet provides a partial support for the glass sheet which positions the glass sheet positively between the glass forming members during its forming regardless of whether the glass is suspended by tongs or supported by other support structure. Reference to the scope of the present invention may be obtained from the claimed subject matter which follows.

What is claimed is:

1. In the art of press bending glass sheets wherein a heat-softened glass sheet is supported in a substantially vertical plane in spaced relation between two substantially complementary glass forming members having complementary shaping surfaces by a support means susceptible of imposing localized stress in the glass during its shaping and is shaped by being sandwiched between the shaping surfaces of said forming members, the improvement comprising moving a selected one of the forming members into contact with one surface of the glass sheet while continuing to support the glass sheet by said support means and the other forming member is out of contact with the glass sheet, and subsequently moving the other forming member toward a mating position with said one forming member while maintaining contact between the first forming member and said one surface of the glass sheet and until the forming members are in alignment with one another and in contact with the opposite surfaces of the glass sheet.

2. In the art of press bending glass sheets wherein a heat-softened glass sheet is supported in a substantially vertical plane in spaced relation between two substantially complementary forming members of convex and concave configuration by a support means susceptible of imposing localized stress in the glass during its shaping so that one glass sheet surface faces said forming member of concave configuration and the other glass sheet surface faces said forming member of convex configuration and the glass sheet is shaped by being sandwiched between said two substantially complementary forming members, the improvement comprising contacting a first surface of the supported glass sheet with a portion of the concave forming member while continuing to support the glass sheet by said support means and the convex forming member is spaced from the opposite surface of the glass sheet, and subsequently moving the convex forming member toward a mating position with said concave forming member while maintaining the first surface of said glass sheet in contact with said concave forming member and until the glass sheet is sandwiched between said concave and convex forming members and said concave and convex forming members are in alignment with one another and in contact with opposite surfaces of the supported glass sheet.

3. In the art of press bending glass sheets wherein a heat-softened glass sheet is initially suspended in a vertical plane by means of tongs which grip said glass sheet adjacent its top edge in spaced relation between two substantially complementary forming members of convex and concave configuration, respectively, so that one glass sheet surface faces said forming member of concave configuration and the other glass sheet surface faces said forming member of convex configuration and the glass sheet is shaped by being sandwiched between said two substantially complementary forming members, the improvement comprising contacting a first surface of the supported glass sheet with a portion of the concave forming member while the convex forming member is spaced from the opposite surface of the glass sheet, and subsequently moving the convex forming member toward a mating position with said concave forming member while maintaining the first surface of said glass sheet in contact with said concave forming member and until the glass sheet is sandwiched between said concave and convex forming members and said concave and convex forming members are in alignment with one another and in contact with opposite surfaces of the supported glass sheet.

4. The improvement according to claim 3, wherein the shaping surfaces of said forming members define complementary curved shapes about a horizontal axis of curvature and said convex forming member is moved in an obliquely upward direction into mating engagement with said concave forming member.

5. The improvement according to claim 2, wherein the shaping surface of said forming members define complementary curved shapes about a horizontal axis of curvature and said convex forming member is moved in an obliquely upward direction into mating engagement with said concave forming member.

6. The improvement according to claim 2, wherein the concave member is stopped substantially simultaneously on making initial contact with the glass sheet.

References Cited in the file of this patent

UNITED STATES PATENTS

| | | |
|---|---|---|
| 1,671,548 | Schlitzer | May 29, 1928 |
| 2,167,318 | Verlay | July 25, 1939 |
| 2,263,005 | McClure | Nov. 18, 1941 |
| 3,058,154 | Howard et al. | Oct. 16, 1962 |